United States Patent [19]

Van Gasse

[11] 4,316,869
[45] Feb. 23, 1982

[54] MOLDING OF LAYERED OBJECTS FROM THERMOSETTING RESINS

[75] Inventor: René L. E. Van Gasse, Opglabbeek, Belgium

[73] Assignee: Stamicarbon, B.V., Geleen, Netherlands

[21] Appl. No.: 144,648

[22] Filed: Apr. 24, 1980

[30] Foreign Application Priority Data

May 2, 1979 [NL] Netherlands ................ 7903428

[51] Int. Cl.³ .............................................. B29D 9/00
[52] U.S. Cl. ........................................ 264/255; 264/24; 264/DIG. 42; 264/DIG. 57
[58] Field of Search ........ 264/24, 46.6, 255, DIG. 42, 264/DIG. 57

[56] References Cited

U.S. PATENT DOCUMENTS

| 3,259,673 | 7/1966 | Ericson | 264/46.6 |
| 3,660,547 | 5/1972 | Ruekoerg | 264/24 |
| 3,878,282 | 4/1975 | Bonio et al. | 264/255 |
| 3,966,870 | 6/1976 | Vecchiotti | 264/225 |
| 4,205,028 | 5/1980 | Brueggemann et al. | 264/24 |
| 4,239,808 | 12/1980 | Arnason | 264/255 |
| 4,244,993 | 1/1981 | Platka et al. | 264/255 |

FOREIGN PATENT DOCUMENTS

| 1034738 | 7/1966 | United Kingdom | 264/255 |
| 1457935 | 12/1976 | United Kingdom | 264/255 |

Primary Examiner—James B. Lowe
Attorney, Agent, or Firm—Cushman, Darby & Cushman

[57] ABSTRACT

A process for applying a cover layer based on thermosetting resin to objects of thermosetting resin.

The process is characterized in that a shape imparting support face is heated to a temperature of 90°–200° C. and then is provided with a cover layer of a thermosetting resin with catalyst. After hardening the cover layer and cooling below 90° C. a basic layer thermosetting resin is applied and hardened.

7 Claims, No Drawings

MOLDING OF LAYERED OBJECTS FROM THERMOSETTING RESINS

The invention relates to a process for the manufacture of objects from a thermosetting resin using a shape-imparting support face on which at least a basic layer of the resin is placed.

In the manufacture of objects from thermosetting resins, whether or not reinforced with glass fiber, it is aimed at reducing as much as possible the amount of manual work required. The use of molds and presses had made is possible to produce objects that do not need a shaping treatment afterwards, by employing so-called prepregs and gel coats. The molds are lined with a gel coat, after which the objects are molded in them under a high pressure. However, the resulting cover layer is insufficiently resistant to scratching, heat, moisture and weathering. Also, this manner of operation results in long cycle times, as the gel coat must be allowed to harden for at least an hour. In spite of the use of relatively expensive equipment, low cost prices can be attained in mass production. However, for objects of the same nature that are made in much smaller series, manual operation remains the cheapest way of production. With manually shaped objects made from thermosetting resins with or without glass fiber reinforcement, finishing, especially of the exposed side(s) of the object, remains an important cost factor, however; this holds, for instance, for the production of hulls for boats. Finishing mostly consists in careful smoothing of the exposed side(s) of the object followed by application thereon of a covering layer consisting of a gel coat. In most cases the shaped objects will need a subsequent thermal treatment or harden the cover layers. These cover layers, too, exhibit the above-mentioned drawbacks.

It is an object of the invention to provide a process for the manufacture of objects from thermosetting resins with or without glass fiber reinforcement that avoids the above-mentioned drawbacks. More in particular it is an object of the invention to provide a cover layer that is attractive in appearance, can be produced to any pattern, possesses excellent resistance to weathering, scratching and the influence of chemicals, and forms a very strong bond with the basic layer. A further object of the invention is to apply the cover layer to hand-shaped objects unsuitable for application of the usual gel coats.

According to the invention, these objects are realized by employing a process for the manufacture of objects from a thermosetting resin with the use of a shape-imparting support face, on which at least a layer of thermosetting resin, hereinafter to be called the basic layer, is applied, this process being characterized in that the support face is heated to a temperature of 90°–200° C. and is provided with a cover layer by applying to it solid or liquid particles of a thermosetting resin along with a catalyst (whether or not containing a pigment), and making said resin melt in the case solid resin particles are applied, and then polymerizing and hardening said resin. Subsequently the basic layer is applied to the cover layer at a temperature of the support face that is below 90° C., and hardened.

The thermosetting resins of the basic layer may consist of unsaturated polyester resins and epoxy resins containing a cross-linking monomer, e.g. styrene. These resins may further contain the usual additives, for instance catalysts, hardening accelerators or retardants, thickening agents, and fillers. These resins may be applied to the cover layer by means of spatulas, brushes, rollers, and sprayers. The pertinent techniques are known by the names of hand lay-up and spray-up. In most cases the thermosetting polymers contain glass fibers in the form of mats or of looses fibers. This layer is preferably formed by successive application of several layers consisting of glass fibers and thermosetting resin. After the application and hardening of the basic layer, the shaped object can be removed from the shape-imparting support face. Before or afterwards, application other of layers consisting of materials of a different kind, for example fiber reinforced cement, foamed polymer or combinations thereof on the basic layer is also possible.

The powdery resin for the cover layer consists preferably of a mixture of 50–92% by weight of unsaturated polyester resin, 5–30% by weight of a prepolymer of a dialkylester of an aromatic dicarboxyl acid, 3–20% by weight of a high boiling, copolymerizable, cross-linking monomer, and 0.1–5% by weight of catalyst. By preference, powders are prepared which contain 57.5–84% weight of unsaturated polyester resin, 7.5–25% by weight of a prepolymer of a dialkylester of an aromatic dicarboxylic acid, 1–15% by weight of a high-boiling monomer, and 1–2.5% by weight of catalyst referred to the total weight of the polymerisable compounds. The unsaturated polyesters resin can be obtained by condensation of a dicarboxylic acid e.g. maleic anhydride, fumaric acid or itaconic acid with a diol containing 2–25 carbon atoms preferably a aliphatic diol with 2–6 carbon atoms or a cycloaliphatic diol and or an alkoxylated bisphenol A, optionally with minor amounts of phthalic acid, isopthalic acid, adipic acid, or aliphatic or cycloaliphatic polyol. The prepolymer used may be the usual, commercially obtainable, incompletely hardened, thermoplastic polymers from a diallylester of an aromatic dicarboxylic acid. Examples of these, at the temperatures of the process, meltable and soluble prepolymers are polydiallybisophtalate, polymers from dialkylester of naphtatalene-dicarbocyclic acid and particularly polydialkylphtalate. Eligible as high-boiling cross-linking monomers are compounds with a boiling point above 200° C., in particular above 250° C. It is important that the monomer has a very low volatility at the temperature of the wall of the mold and accordingly a low vapor pressure, preferably less than 10 mm mercury (Hg) at 150° C. The melting point of these monomers preferably lies above room temperature, 18° C. Suitable cross-linking monomers are difunctional as well as, and by preference, triple function alkyl groups containing monomers. These are eligible from the group consisting of alkacrylates of polyfunctional alcohols, in particular acrylates, methacrylates and more particularly tri-alkyl-cyanurate and tri-alkyl-isocyanurate. Catalysts that may be used are, e.g., per-acids, per-alcohols, ketoneperoxides, and per-esters. Very suitable catalysts are benzoylperoxide, tertiary butylperoxide, per-esters of tertiary butanol. The activity of the catalyst must be such that at a temperature of 115° C. or above, the half-life value amounts to 1 min. In most cases the temperature needed for reaching a half-life value of 1 minute is between 120° and 150° C.

The catalyst is so admixed that a very high proportion of its activity is retained. This can be achieved by at once mixing into the melt the entire quantity of unsaturated polyester resin, prepolymer and cross-linking monomer, but it is also possible at first to keep apart some of the pre-polymer and/or the cross-linking monomer, and pre-mix this with the catalyst at a low temperature (i.e. below 75° C.). Next, the catalyst, together with the remaining portion, if any, of the other components, is added to the melt and rapidly mixed with it, in which operation the temperature is at least 20° C. below the temperature required to reach the 1 min. half-life value of the catalyst, and the time during which the catalyst is exposed to the higher mixing temperature is at most 30 seconds. Preferably, the catalyst is admixed at a temperature of between 75° and 90° C., with the time during which the catalyst is exposed to the higher temperature being max. 15 seconds. Such rapid mixing can be achieved for instance in a mixing extruder or a static in-line mixer. The mixture containing the catalyst is cooled as rapidly as possible, e.g. on a cooled roller. The cooling rate should preferably be at least 50° C. per minute. The solidified mixture may thereafter be ground to the required particle size, preferably while being cooled. For most purposes a mean particle size of 0.01 to 0.15 mm is suitable. Optionally, other commonly used components may be incorporated in the powder, e.g., pigment, release agent, filler, flame-suppressing additives, etc.

The resin for the cover layer may also be applied to the support face in the form of a liquid. It is essential in this case that no solvent or low boiling, cross-linking monomer is applied. The powder may be melted to this end by preheating. It is also possible to prepare a liquid melted resin on the basis of polyesters with a lower melting point, and to add the catalyst not sooner than in the head of the sprayer spraying the liquid resin onto the support face.

The resin is preferably applied to the support face by electrostatic spraying and polymerized and hardened thereon by heating to 90°–200° C., preferably to 110°–175° C. Subsequently, the temperature of the support face is reduced to below 90° C., preferably to below 80° C., after which one or more layers of resin and, optionally, glass fiber, are applied to form the basic layer. The basic layer is subsequently hardened and proves to have formed an integral unit with the cover layer. Although this basic layer is preferably hardened without heating, the temperature may go up as a result of the polymerization reaction.

The advantage of the invention is that it is now also possible for small series, in which the use of a press mold is prohibited by the high cost of a press mold, to obtain products with a surface of high quality. The cover layer is very regular in thickness, chemically strongly bonded to the basic layer and demonstrates a remarkably good gloss in comparison with so-called gel coat cover layers. Further advantages of the invention are the long shelf-life of the cover layer material and the short cycle times caused by the rapid polymerisation.

The composition of the cover layer results in very good mechanical properties combined with a smooth and nonporous surface. Particularly the hardness, rigidity, softening-temperature and resistance to fire are excellent. The invention can be used in the manufacture of boats, coachwork, and parts of housings such as caravans, bungalows and switch cases.

EXAMPLE I

A powder is prepared by mixing 80 parts by weight of unsaterated polyester resin, softening point 108° C. according to ASTM D36-26, 20 parts by weight of diallylphthalate prepolymer, 8 parts by weight of triallylcyanurate (boiling point over 250° C., melting point 27° C. (vapor pressure at 150° C. is 1 mm Hg), and 7 parts by weight of pigment. This mixture is heated to a homogeneous melt at 140° C. To this melt is added 1 part by weight of tert-butylperbenzoate at 140° half life time 15 min; (at 170° C. half life time of 1 minute), after which the mixture is immediately cooled to 20° C. The cooled product is next ground to a powder, of which 25% by weight consists of particles smaller than 20 microns, and 98% by weight of particles smaller than 90 microns.

A polished mold is heated to 150° C., after which the powder is electrostatically sprayed onto it. For two minutes after the application of the powder the mold is kept at a temperature of 150° C., during which time the powder melts and the resin polymerizes and hardens. Thereafter the mold is cooled to 30° C.

Subsequently the basic layer is applied to this polymerized and hardened cover layer in the usual way by the hand lay-up method, this basic layer consisting of an isophthalic polyester resin and the usual additives, such as catalyst, accelerator, and glass fibre matting. The glass content of the basic layer is 30% of its total weight. After 15 minutes the resulting product is removed from the mold and tested.

EXAMPLE II

The powder of example I is applied onto the mold wall in the same way as in example I. The mold is now cooled to 50° C. Subsequently the basic layer is applied on this polymerized and hardened cover layer by pouring.

The basic layer consists of:
100 parts by weight of unmodified liquid epoxy resin;
60 parts by weight of a modified amine hardener;
200 parts by weight of silica flour, grain diameter smaller than 100 microns;
450 parts by weight of silica sand, grain diameter 100–300 microns. After 30 minutes the resulting product is removed from the mold and tested.

The surfaces of the products resulting from examples I and II show excellent resistance to scratching, viz. three times better (as tested by the Erichson method) than a normal gel coat. Also the resistance to water is excellent. After 1 week of heating in water at 80° C. the surface shows no change, whereas gel coats show blistering. This severe testing shows that the bond between cover layer and basic layer is exceptionally strong.

The products further show excellent weatherability. After 750 hours of illumination in a Weatherometer no discoloration or attack was observable, unlike with a normal gel coat, the surface of which showed distinct signs of attack.

We claim:
1. A process for manufacturing objects having a cover layer and an underlying basic layer bonded thereto, each layer being formed from a thermosetting resin, using only a shape-imparting support face to which at least said cover layer of thermosetting resin is applied, wherein said process employs the combination of steps of:
   a. heating said support face to a temperature between 90° C. and 200° C.;
   b. forming a cover layer by applying a first thermosetting resin as liquid or solid fine particles along with a catalyst to said support face, and causing any solid resin to melt and effecting polymerization and curing of said first resin; and c. forming a basic layer by applying a second cross-linking thermosetting resin to said formed cover layer and then curing said second resin while maintaining a support face temperature below 90° C. whereby said second resin forms said basic layer bonded to said cover layer.

2. A process according to claim 1, wherein said cover layer resin contains 50% to 92% by weight of unsaturated polyester resin, 5% to 30% by weight of a prepolymer from a dialkylester of a aromatic dicarboxylic acid, 3% to 20% by weight of a high boiling, co-polymerizable, cross-linking monomer and 0.1% to 5% by weight of catalyst based on the total weight of the polymerizable compounds.

3. Process according to claim 1, wherein said resin in said cover layer contains pigments.

4. Process according to claims 1 or 2, wherein in step a. said support face is heated to a temperature of 110° C.–175° C.

5. Process according to claims 1 or 2 wherein in step c. said temperature of said support face is lowered to below 80° C. before said second resin is applied.

6. Process according to claim 5 wherein said basic layer is formed from a said second thermosetting resin admixed with glass fibers.

7. Process according to claim 6, wherein said basic layer is formed by successively applying layers of resin and glass fibers to said cover layer.

* * * * *

UNITED STATES PATENT AND TRADEMARK OFFICE
CERTIFICATE OF CORRECTION

PATENT NO. : 4,316,869

DATED : February 23, 1982

INVENTOR(S) : Rene L. E. VAN GASSE

It is certified that error appears in the above-identified patent and that said Letters Patent is hereby corrected as shown below:

Column 2, line 19, "dialkylester" should be --diallylester--.

Column 2, line 24, "dialkylester" should be --diallylester--.

Column 2, line 40, "polydiallybisophalate" should be --polydiallylisophthalate--.

Column 2, line 40, "dialkylester" should be --diallylester--.

Column 2, line 41, "naphtatalene" should be --naphthalene--.

Column 2, line 42, "polydialkylptalate" should be --polydiallylphthalate--.

Column 2, line 51, "triple function alkylgroups" should be --triple functional allyl groups--.

Column 2, line 55, "tri-alkyl-cyanurate" should be --tri-allyl-cyanurate--.

UNITED STATES PATENT AND TRADEMARK OFFICE
CERTIFICATE OF CORRECTION

PATENT NO. : 4,316,869        Page 2 of 2

DATED : February 23, 1982

INVENTOR(S) : Rene L. E. VAN GASSE

It is certified that error appears in the above-identified patent and that said Letters Patent is hereby corrected as shown below:

Column 2, line 55, "tri-alkyl-isocyanu-" should be -- tri-allyl-isocyanu- --.

Column 5, line 11, "dialkylester" should be --diallylester--.

Signed and Sealed this

Twentieth Day of September 1983

[SEAL]

Attest:

Attesting Officer

GERALD J. MOSSINGHOFF

Commissioner of Patents and Trademarks